United States Patent [19]

Innes

[11] Patent Number: 5,715,129
[45] Date of Patent: Feb. 3, 1998

[54] ELECTRONIC OVERLOAD RELAY HAVING INTRINSIC POWER SUPPLY OPERABLE FROM POWER APPLIED TO CONTACTOR COIL

[75] Inventor: Mark E. Innes, Asheville, N.C.

[73] Assignee: Eaton Corporation, Cleveland, Ohio

[21] Appl. No.: 567,664

[22] Filed: Dec. 5, 1995

[51] Int. Cl.$^6$ .................................................. H02H 3/00
[52] U.S. Cl. .......................................... 361/93; 307/125
[58] Field of Search ........................ 361/152, 154–156, 361/166, 187, 23, 24, 93; 307/125

[56] References Cited

U.S. PATENT DOCUMENTS

| | | | |
|---|---|---|---|
| 3,965,396 | 6/1976 | Tyler et al. | 361/24 |
| 4,297,741 | 10/1981 | Howell | 361/93 |
| 5,038,246 | 8/1991 | Durivage, III | 361/93 |
| 5,243,489 | 9/1993 | Dougherty | 361/93 |
| 5,283,708 | 2/1994 | Waltz | 361/93 |
| 5,373,412 | 12/1994 | Dousse | 361/93 |
| 5,570,262 | 10/1996 | Doerwald | 361/93 |
| 5,604,387 | 2/1997 | Cheyne | 307/125 |

*Primary Examiner*—Jeffrey A. Gaffin
*Assistant Examiner*—Thuy-Trang N. Huynh
*Attorney, Agent, or Firm*—Larry G. Vandezande

[57] ABSTRACT

An electronic overload relay has an intrinsic power supply connected in parallel with the NC contact of the relay between wire attachment terminals. The power supply is a parallel connected zener diode and capacitor, connected to the processor in parallel with a low voltage sensing circuit that detects the charge on the capacitor, whereby the processor operates to turn on a unijunction transistor for low voltage coil applications to shunt the power supply during contactor closing and turn off a predetermined interval later by which time the contactor should have closed.

5 Claims, 1 Drawing Sheet

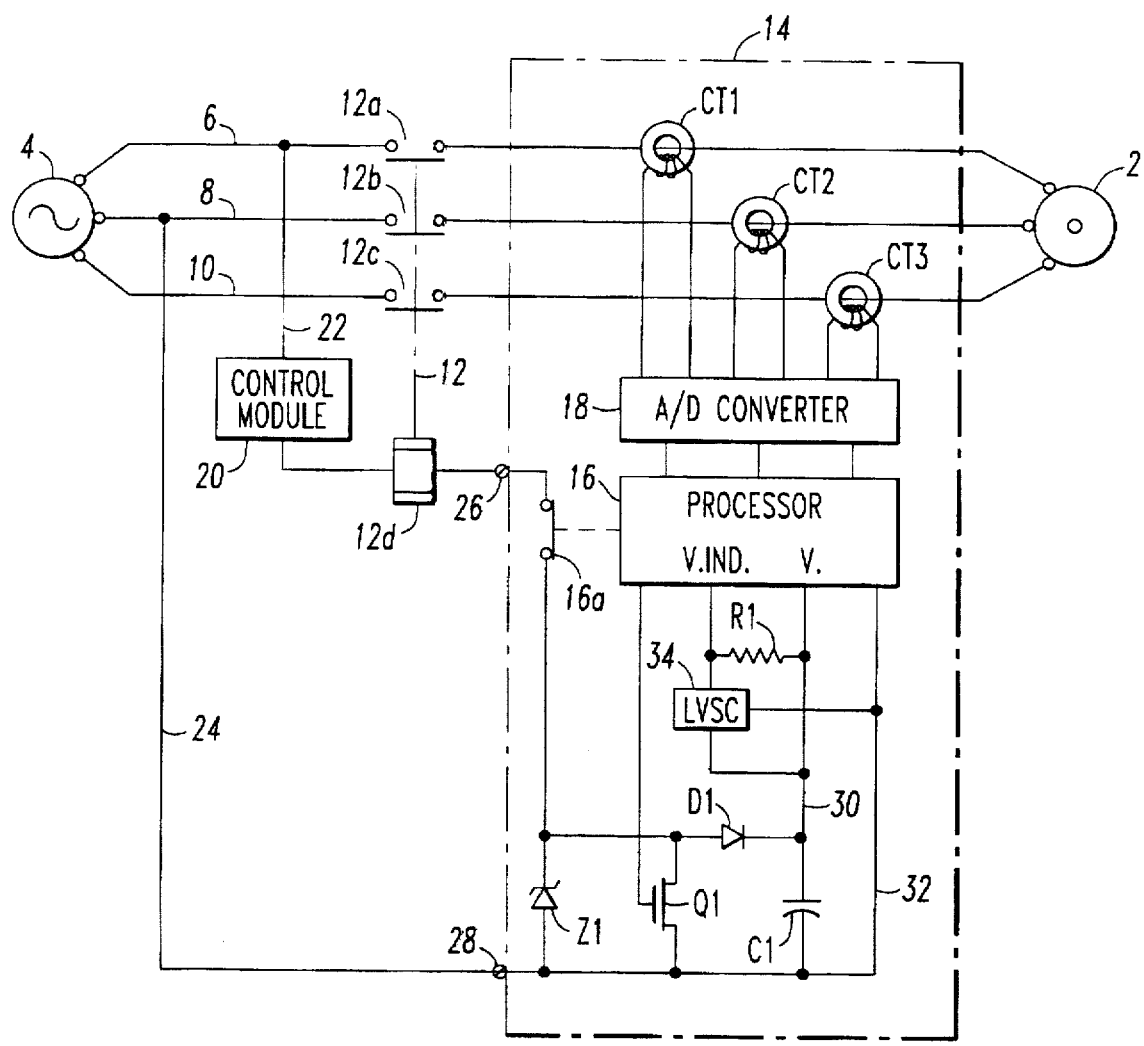

ELECTRONIC OVERLOAD RELAY HAVING INTRINSIC POWER SUPPLY OPERABLE FROM POWER APPLIED TO CONTACTOR COIL

BACKGROUND OF THE INVENTION

This invention relates to overload relays and overload protective systems and in particular to electronic overload relays and systems. Presently available thermal overload relays utilize special materials in the heater and detector elements, and require individual adjustment during manufacture to calibrate the device. Each of these factors increase the cost of the present thermal overload relay. A need exists for a low cost overload relay, particularly such a relay that may be conventionally wired to an electromagnetic contactor to provide a motor starter. Electronic overload relays and systems are generally less expensive than the thermal counterparts if power for the relay can be either derived from the motor current or separately supplied in an economical manner.

SUMMARY OF THE INVENTION

This invention provides a low cost electronic overload relay having a power supply in series with the normally closed contact of the overload relay. The power supply is an integral element of the electronic overload relay of this invention. The relay is connectable to an electromagnetic contactor in keeping with conventions of thermal overload relays wherein the contactor coil is connected in series with the normally closed contact of the relay, and therefore also in series with the power supply to provide power for the overload relay when power is supplied to the contactor coil. A processor in the electronic overload relay is instructed to assume a sleep (extremely low power consumption) mode during the closing of the contactor. A semiconductor switch in the power supply is operated by the processor in low voltage coil applications to directly connect the coil of the contactor in shunt of the power supply for the relay while the contactor closes. These and other features and advantages of this invention will become more readily apparent in the following description and claims when read in conjunction with the accompanying drawings.

BRIEF DESCRIPTION OF THE DRAWINGS

The sole FIGURE of the drawing is a wiring diagram of the control powered overload relay of this invention.

DETAILED DESCRIPTION OF THE PREFERRED EMBODIMENT

Referring to the drawing, a motor 2 is connected to a source of electrical power such as three phase AC source 4 through conductors 6, 8 and 10 by a contactor 12 having contacts 12a, 12b and 12c connected in the conductors 6, 8 and 10, respectively, and a coil 12d. An overload relay 14 is associated with contactor 12 to provide a starter control for motor 2.

Overload relay 14 comprises current transformers CT1, CT2, and CT3 respectively associated with the conductors 6, 8 and 10 to monitor current flowing therethrough and to send representative analog signals of the current levels to a processor 16 as digital signals by means of an analog-to-digital (a/d) converter 18. The processor 16 processes the digitized signals from the current transformers to provide overload protection for motor 2 in a manner which is well known in the art. Processor 16 controls a normally closed contact 16a to open that contact in the event predetermined current/time characteristics in the motor circuit are exceeded.

Overload relay 14 is connected in a control circuit for contactor 12 such that the normally closed contact 16a is connected in series with coil 12d. Power for the control circuit may be supplied by a separate electrical power source such as a separate AC supply or, as shown in the drawings, may be a two phase supply taken from three phase supply 4 by connecting conductors 22 and 24 to conductors 6 and 8, respectively. A control module 20 for contactor coil 12d is connected in the control circuit via conductor 22. Overload relay 14 has terminals 26 and 28 which internally connect to opposite sides of normally closed contact 16a for connecting that contact in a control circuit for the coil 12d in the conventional manner that a normally closed contact of a thermal overload relay would be connected. Processor 16 is one of a family of processors available from Motorola Semiconductor Products, Inc., such as Motorola Catalog No. 68HC05P6.

Electronic overload relay processors require low voltage electric power. If a separate source of low voltage electrical power is provided, additional wires are required to bring the power from the source to the overload relay and additional terminals are necessary on the overload relay 14 for connection of such wires. The separate power supply, additional wire, terminals and labor represent additional cost and diversion from conventional wiring methods used to connect thermal overload relays in contactor circuits. If power for the processor is taken from the control circuit for the coil, such power may become diverted from the contactor coil 12d during closure of the contactor, reducing the closing power for the contactor and its sealing capability.

The overload relay of this invention provides its own zener diode shunt power supply in series with the normally closed contact 16a. Wiring terminals 26 and 28 are provided on the relay preferably on the housing (not shown) at opposite sides of the normally closed contact and the zener power supply for purposes of connecting the normally closed contact 16a in the contactor coil control circuit. The power supply comprises a zener diode Z1 in series with the normally closed contact 16a and coil 12d or other suitable load. The anode of a diode D1 is connected to the cathode of zener diode Z1. The cathode of diode D1 is connected to the positive terminal of a capacitor C1. C1 is referenced to the anode of zener diode Z1 and is connected to terminal 28. Opposite sides of capacitor C1 are connected to the processor 16 by conductors 30 and 32. A low voltage sensing integrated circuit 34 such as a Motorola MC34164 is connected to processor 16 in parallel with conductor 30, the output of circuit 34 being connected to a voltage indicator input of the processor. A pull-up resistor R1 is connected between conductor 30 and the conductor connecting circuit 34 to the voltage indicator input of processor 16.

A command from control module 20 for contactor 12 to close energizes coil 12d through normally closed contact 16a and the zener power supply. Zener diode Z1 is a 5.6 volt device which limits the charge on capacitor C1 to approximately 5 volts. When the voltage at capacitor C1 reaches approximately 3 volts, processor 16 turns on. Low voltage sensing circuit 34 is a voltage monitor having a threshold of 4.65 volts. If this threshold is not crossed, then either an extremely low voltage is present, or coil 12d is a high voltage, high impedance coil. Once the processor 16 is powered from the charged capacitor C1, it is programmed to immediately enter into a low power consumption "sleep"

mode for several cycles so that the power to contactor coil 12d is not reduced during contactor closing. If no signal is present at the voltage indicator input of processor 16 indicating that the threshold voltage of low voltage sensing circuit 34 has not been crossed, then coil 12d is a high voltage coil and the relatively small amount of power diverted from the coil circuit for running processor 16 in a sleep mode is a negligible percentage of the power to coil 12d. Conversely, if a signal is present at the voltage indicator input of processor 16, then capacitor C1 has charged to a value exceeding 4.65 volts within a given time interval, indicating that coil 12d is a low voltage coil.

It is important that no power be diverted from a low voltage coil during closure of contactor 12. To this end, a semiconductor switch such as N-channel FET Q1 is connected in parallel with zener diode Z1. FET Q1 is turned on by processor 16 at power-up if a signal is present at the voltage indicator input, thereby to shunt zener diode Z1. Conduction of FET Q1 directly connects coil 12d across the control circuit power through normally closed contact 16a. Diode D1 blocks current flow from capacitor C1 through the conducting FET Q1 to prevent discharge of capacitor C1 through FET Q1, thereby maintaining power to processor 16. Once the contactor 12 has operated and the armature thereof is sealed, power can again be taken from the coil circuit to power processor 16 without penalty to the contactor coil. Accordingly, after a prescribed time interval or number of cycles, processor 16 is instructed to exit the "sleep" mode and to resume its normal operating mode whereupon FET Q1 is turned off. If an overload or other disturbance is sensed on the lines 6, 8 and/or 10 by the current transformers CT1, CT2 or CT3, the processor will operate to open normally closed contact 16a in the control circuit to coil 12d, thereby de-energizing the coil 12d and opening the contacts 12a, 12b and 12c of contactor 12 to disconnect motor 2 from electric power supply 4.

Although the foregoing has described particular embodiments of the invention in detail, it is to be understood that the invention is susceptible of various modifications without departing from the scope of the appended claims.

I claim:

1. An electronic overload relay for protecting a load supplied with three phase electrical power through contacts of an electromagnetic contactor, said overload relay comprising:

a normally closed contact adapted to be connected in an energizing circuit of an operating coil of said electromagnetic contactor;

means for monitoring current to said load in separate phases of said three phase power and for providing electrical signals representative of said current in each said phase;

processor means for receiving and processing said signals, said processor means being operative in response to predetermined conditions of said signals for effecting opening of said normally closed contact thereby to de-energize said contactor coil, open said contactor contacts and disconnect power from said load; and an intrinsic power supply for supplying power to said processor, said power supply consisting of:
　a capacitor connected to said processor for supplying a predetermined voltage to said processor;
　a breakover voltage device connected directly in series with said normally closed contact and connected in parallel with said capacitor for limiting a charge on said capacitor to said predetermined voltage; and
　a diode connected between said capacitor and said breakover voltage device blocking current flow from said capacitor to said breakover voltage device.

2. The electronic overload relay defined in claim 1 wherein said processor is turned on at a voltage on said capacitor less than said predetermined voltage, said processor being programmed to operate in a low power consumption sleep mode for a timed interval after turn on to reduce power taken from said coil energizing circuit during operation of said contactor.

3. The electronic overload relay defined in claim 2 comprising an electronic switch connected in parallel with said breakover voltage device, said electronic switch being controlled and operated by said processor to a conducting state in shunt of said capacitor for a timed interval during energization of said contactor coil.

4. The electronic overload relay defined in claim 3 comprising low voltage sensing means connected between said capacitor and said processor in parallel with a direct connection of said capacitor to said processor, and said processor effecting operation of said electronic switch to a conducting state only if a low voltage signal is provided by said low voltage detecting circuit.

5. The electronic overload relay defined in claim 3 wherein said diode is connected between said electronic switch and said capacitor preventing said capacitor from being discharged through said conducting electronic switch.

* * * * *